US006407520B1

(12) United States Patent
Kleefeldt et al.

(10) Patent No.: US 6,407,520 B1
(45) Date of Patent: Jun. 18, 2002

(54) MOTOR-VEHICLE DOOR LOCK

(75) Inventors: Frank Kleefeldt, Heiligenhaus; Fred Welskopf, Herne, both of (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 09/697,680

(22) Filed: Oct. 25, 2000

(30) Foreign Application Priority Data

Oct. 26, 1999 (DE) ........................................ 199 51 463

(51) Int. Cl.[7] .............................. H02P 7/29; E05C 3/26

(52) U.S. Cl. ........................ 318/162; 318/163; 318/266; 318/286; 388/904; 292/201

(58) Field of Search ................................ 318/599, 626, 318/162, 163, 255, 256, 257, 264, 265, 266, 286, 293, 466, 468; 388/904, 907.2; 200/61.64; 70/237, 256; 292/195, 201, 341.15, 341.16, DIG. 23, DIG. 67

(56) References Cited

U.S. PATENT DOCUMENTS

| | | | | |
|---|---|---|---|---|
| 4,032,180 A | * | 6/1977 | Pohl |
| 4,176,250 A | * | 11/1979 | Berglind |
| 4,593,543 A | * | 6/1986 | Stefanek |
| 4,735,447 A | | 4/1988 | Kleefeldt |

* cited by examiner

*Primary Examiner*—Bentsu Ro
(74) *Attorney, Agent, or Firm*—Herbert Dubno

(57) ABSTRACT

A motor-vehicle door latch to avoid unnecessary sound emission, has its motor operated with pulse-width modulation so that, once a blockade time point is reached or prior thereto, the motor is energized with reduced power so that it generates a ramp characteristic running to a minimum. The torque and/or speed are thereby reduced along the ramp characteristic correspondingly.

10 Claims, 5 Drawing Sheets

MOTOR-VEHICLE DOOR LOCK

FIELD OF THE INVENTION

Our present invention relates to a motor-vehicle door lock of the type in which a lock mechanism, usually provided with a locking lever and an electric-motor drive, is electrically energized to displace the mechanism between locked and unlocked positions. In particular, the invention relates to such door locks which may be connected in a central-locking system for the vehicle and which within or at the end of a time interval for an energization which is sufficient to lock or unlock the device, the mechanism has a blocked position at a certain point in time. This point in time, at which the mechanism is mechanically blocked is referred to herein as the blockade time point.

BACKGROUND OF THE INVENTION

Vehicle-door locks which are motorized and in which the electric motor can be connected via a transmission to an actuator which, in turn, can be coupled with a central locking lever of a mechanism for locking and unlocking the vehicle door, can be electrically energized through a central locking system of the vehicle. A particularly effective vehicle-door lock or latch for that purpose is described in German patent document DE 35 26 501 C2 and U.S. Pat. No. 4,735,447.

The door latch is energized usually for a predetermined time interval which suffices to displace the mechanism between the unlocked and locked position and usually this energization in time is sufficient to compensate for any tolerances or lags in the mechanical system. In other words the blockade time point usually lies within the predetermined time interval.

Usually at the ends of the positions "unlocked" and "locked", the latch mechanism engages an abutment. Since the energization of the electric motor of this mechanism can continue beyond engagement with the abutment so that the mechanism largely is at standstill and the mechanism is thus mechanically stressed.

In many cases, the elements of the transmission are composed of synthetic resin materials or are so shaped to bend or compress slightly. The result is an elastic deformation of mechanical parts of the latch which can give rise to a variety of problems.

Where the mechanism is a unit which is connected to the door closure via a rod, lever or linkage, the number of elastic parts in the system is increased.

Since the de-energization of the electric-motor drive usually is incident and the relief of the mechanical stress is abrupt, the elasticity of the system is liberated correspondingly abruptly and can give rise to a movement of parts within a certain play of the system at its bearing and mechanical coupling points which can produce undesirable sounds.

Indeed, two completely separate sounds may be produced in such a latch system. The first sound, which is usually desirable, signals the attainment of an end position, either the blockade instant or the point of engagement with the abutment. However, the second sound, which is produced when the stress is released from the mechanical system is an undesirable sound and may confuse the user. For example, when the first sound signals that the door is latched or locked, the second sound may improperly confuse the user into thinking that the door is unlatched.

OBJECTS OF THE INVENTION

It is, therefore, the principal object of the present invention to eliminate this drawback and in particular prevent the sounds associated with the relief of the stresses in the mechanical-latch portions of a motor-vehicle door lock.

Another object of this invention is to so improve the motor-vehicle latch of the type described in the aforementioned patent that detrimental or undesirable sounds as a consequence of elasticity in the drive system can be reliably avoided.

Still another object of this invention is to provide an improved latch system which avoids drawbacks of earlier devices.

SUMMARY OF THE INVENTION

These objects and others which will become apparent hereinafter are attained, in accordance with the invention in a motor-vehicle door lock which comprises:

a lock housing;

a lock mechanism in the housing having a central locking lever displaceable between locked and unlocked positions and an actuator mechanically coupled with the lever for displacing same;

an electric motor drive coupled with the actuator and including an electric motor; and an electric circuit connected with the electric motor for electrically energizing same for a required time interval for displacing the lever between the positions whereby the electric motor drive is blocked at a blocking point in time within or at an end of the time interval, the electric circuit having circuit elements for reducing electrical energization of the motor so that at least one of the torque and speed of the motor is reduced with time along a ramp characteristic.

With the system of the invention, therefore, the electrical energization of the drive and thus the torque and/or speed generated thereby can be reduced along a ramp and not incidentally, suddenly or in a shock-generating manner as has heretofore been the case.

The invention is based upon the fact that the product of the speed and the torque of an electric-motor drive corresponds substantially to the electric power of that motor. A reduction of the torque and/or the speed is thus associated with a reduction in the electric power consumption and vice versa.

When the drive is energized electrically with pulse width modulated electric power, i.e. with current pulses of a predetermined duration and frequency and usually rectangular pulses, it is possible, according to the invention, to operate with a pulse with a modulation duty factor which is reduced from a maximum value to a minimum value along the aforementioned ramp characteristic.

In pulse-width modulation, the pulses are of a duration which bears a ratio to the period of the pulses (determined by the frequency) which can range from 100% (i.e. practically a direct-current signal) to 0% (complete de-energization or 0% current flow). With the invention, the pulse-width modulation duty factor or going ratio, i.e. the ratio of pulse duration to period, can be reduced from a maximum value to a minimum value over the ramp characteristic.

According to a feature of the invention, therefore, this ramp can begin at a predetermined maximum value of the duty factor, for example, 100%, and decrease to a minimum value, (for example, 0%) along a substantially linear or continuous ramp. The duty factor is reduced until blocking of the drive occurs, usually at this minimum value. It is also possible to carry out de-energization of the drive by reducing the duty factor from its maximum value to its minimum value along a plurality of linear ramps, usually at least two and at least two adjoining ramp segments can have different slopes.

The beginning of the ramp can coincide with the blockade time point or can commence at a predetermined interval before this time point.

In all of the cases described, the de-energization of the drive, i.e. the shutdown, takes place cleanly with relief of any mechanical stresses and thereby eliminates the second detrimental noise which has resulted heretofore from abrupt de-energization. The second noise can be completely eliminated when the ramp commences before the blockade time point is reached so that the blockade time point coincides with the minimum value of the ramp or, lies within the ramp so that the ramp does not extend significantly beyond the blockade time point. The circuitry for the purposes described can include semiconductors, usually FET transistors which simply the pulse-width modulation. A conventional microcontroller or microprocessor with appropriate hardware or software (firm wear) can be used to control the FETs and thus to provide linear pulse-width modulation control.

With this system the linear relationship between the motor current or motor power and torque and hence the linear torque increase or decrease can be simply programmed and hence the ramp controlled by the microprocessor. Preferably the pulse-width modulation frequency is 15 kHz or more so that the control operations themselves do not generate any audible sound level.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
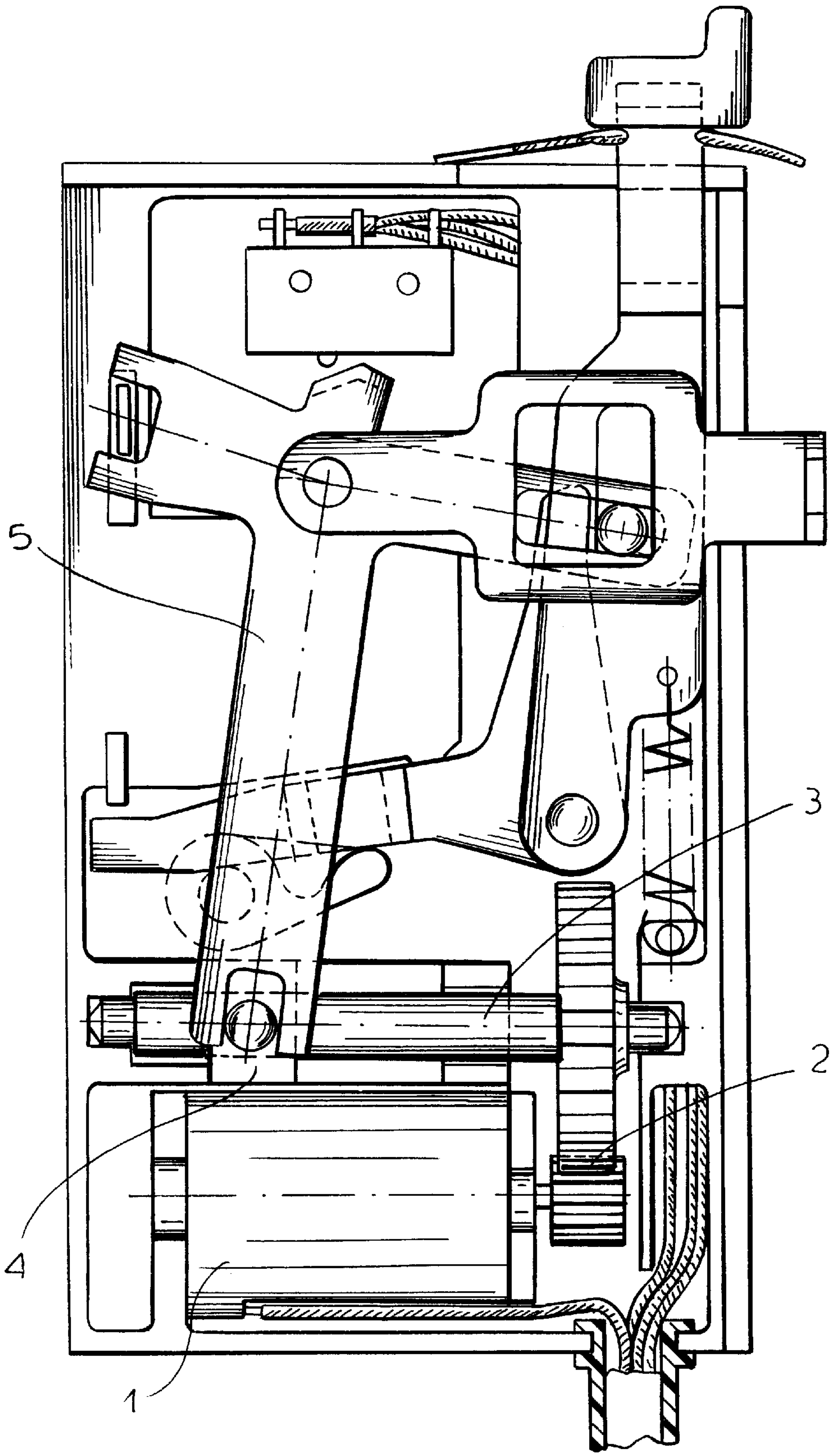
FIG. 1 is a diagram of a motor-vehicle door lock according to the invention.

The drawing shows a motor-vehicle door lock (FIG. 1) of the type described in the aforementioned U.S. patent and which therefore is not described in greater detail herein, except to note that it includes an electric motor drive 1 which can be part of a central locking system. The electric motor 1 acts via a transmission 2, 3 on an actuator 4. The actuator 4 engages the latch mechanism which has a lever 5 which can be referred to as the central lock element of the apparatus. As described in the aforementioned patent, the lever 5 is displaced by rotation of the spindle 3 of the transmission, the latter being driven by the gearing 2 thereof. With the aid of the lever 5 and the other parts of the mechanism, the latch can be displaced between open and closed positions and has a blocking position as has been described and is discussed in depth in the aforementioned patent.

Figure 2:
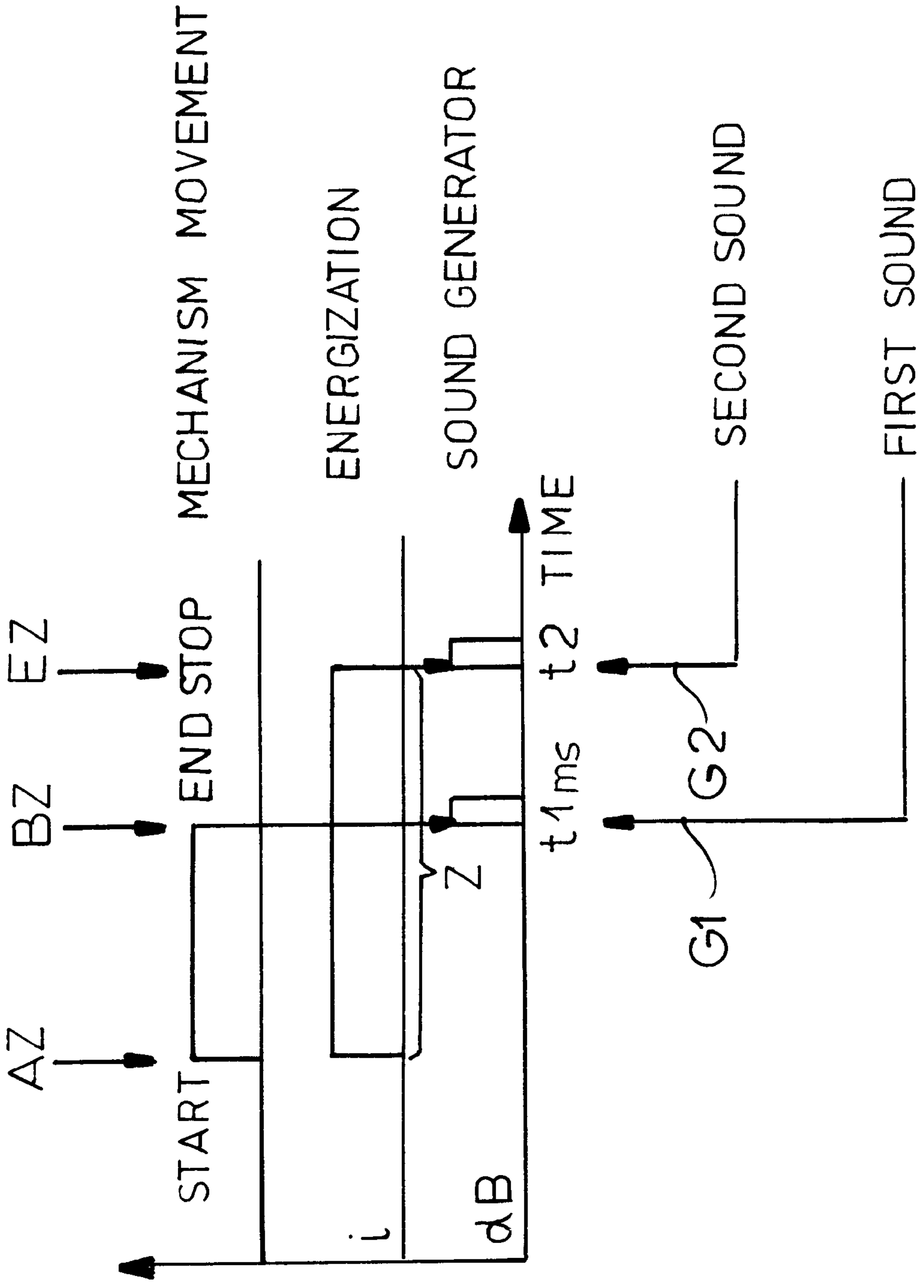
FIG. 2 is a timing diagram illustrating the effect of the prior art mode of operation of such a door lock.
Figure 3:
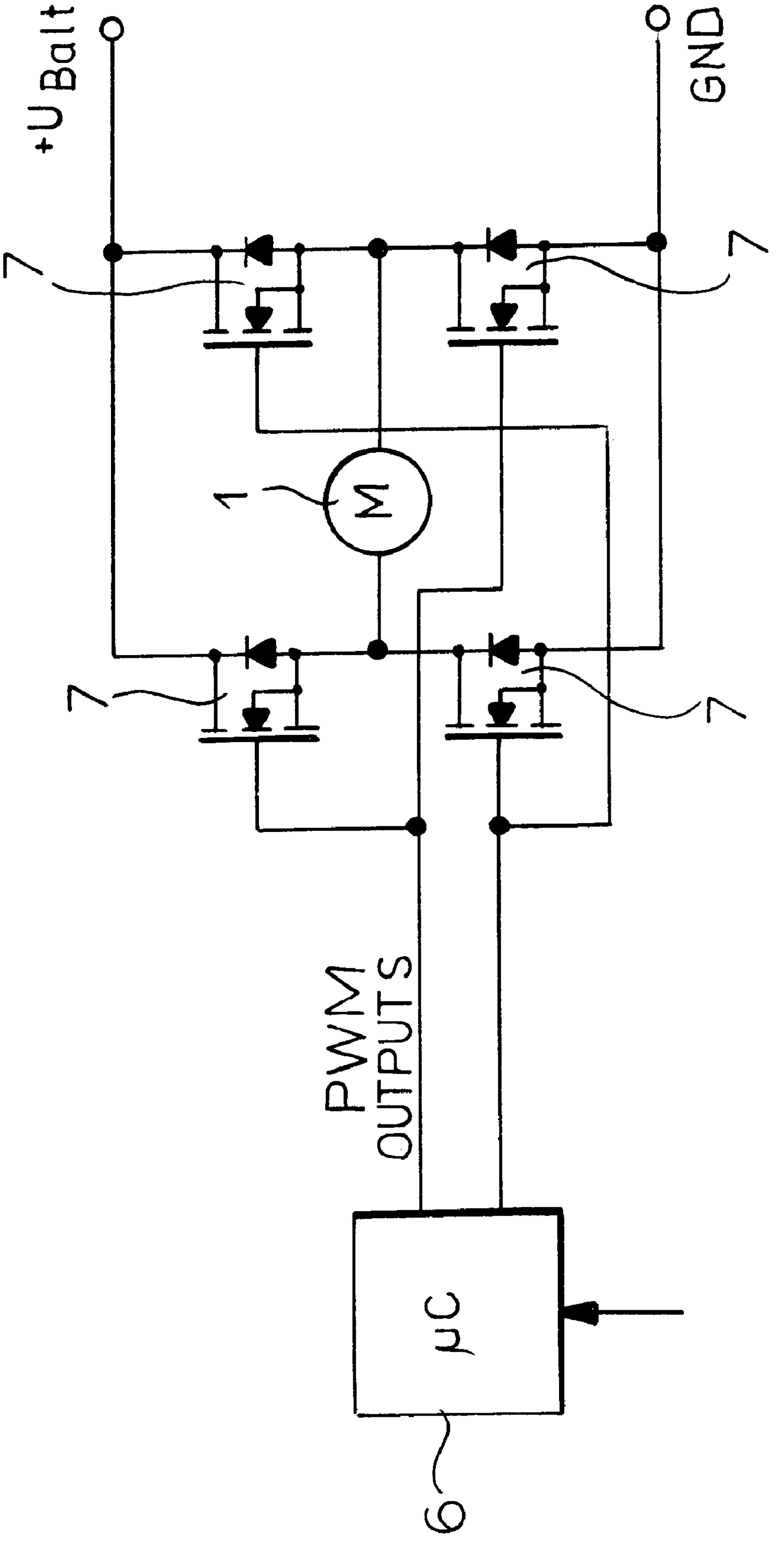
FIG. 3 is a circuit diagram of the control of the door lock of the intention.

For operation of the mechanism 2, 3, 4, 5, the motor 1 must be energized at least for a time interval Z which has been illustrated diagrammatically in FIG. 2 for a conventional door latch. FIG. 2 shows three different time courses in graphs located one above the other. The upper graph shows the movement of the lock mechanism as a function of time. The second graph shows the electrical energization of the motor as a function of time and can represent a single-current pulse which may be used for that purpose. The second graph is therefore a current versus time diagram.

The lower graph represents the noise generation and thus represents a sound amplitude versus time diagram.

From these diagrams it can be seen that energization depends at a starting point AZ which, of course, corresponds to the commencement of movement of the mechanism. The mechanism stops at a point BZ when the mechanism contacts the end stop or abutment at the blockade time point BZ. Because of the impact against the abutment, a first sound G1 which can represent the door locking is generated and is satisfying to the user because it indicates that the door has actually latched properly.

The energization, however, continues to an end point EZ to ensure that the current will not be prematurely cut off and as a result, between the points BZ and EZ, the mechanism is elastically stressed so that at cut-off at time t2, a second sound G2 is triggered which is annoying and may mislead the user as to the state of the system.

Figure 5:
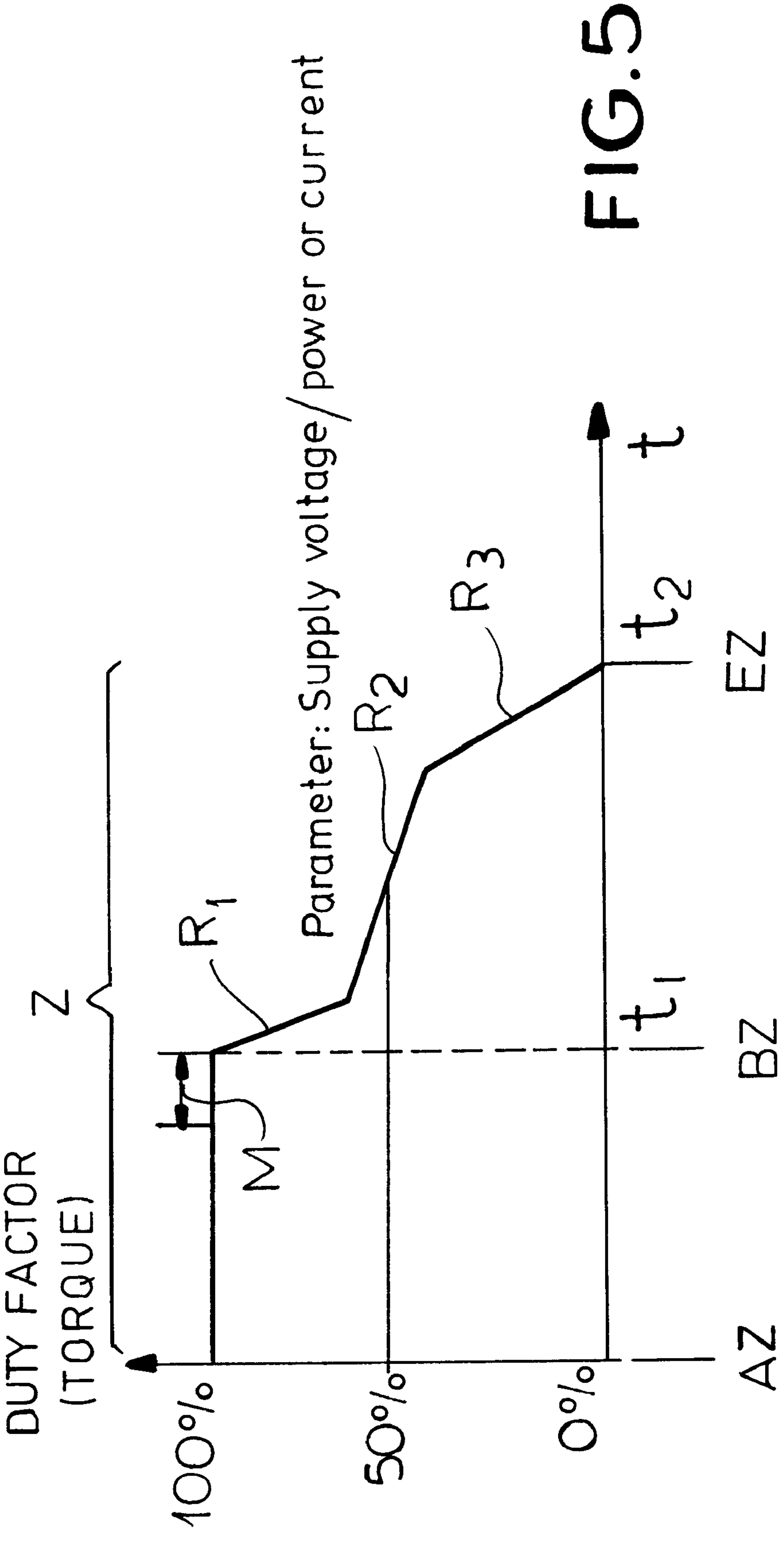
FIG. 5 is a diagram illustrating the invention.

As a consequence the invention utilizes the relationship shown in FIG. 5 in which, for example, the torque, in terms of the duty factor is plotted along the ordinate against time on the abscissa. Here again the total time interval of energization is represented at Z but at the point BZ or some fraction of a second prior thereto by a time interval F, the energization level is reduced along a ramp characteristic. In the embodiment shown, the ramp consists of at least two and possibly three segments, R1, R2, R3 which can differ in slope from one to the other. In all cases, however, over the ramp characteristic, the duty factor is reduced form a maximum which can be 100% to a minimum which can be 0%.

Figure 4:
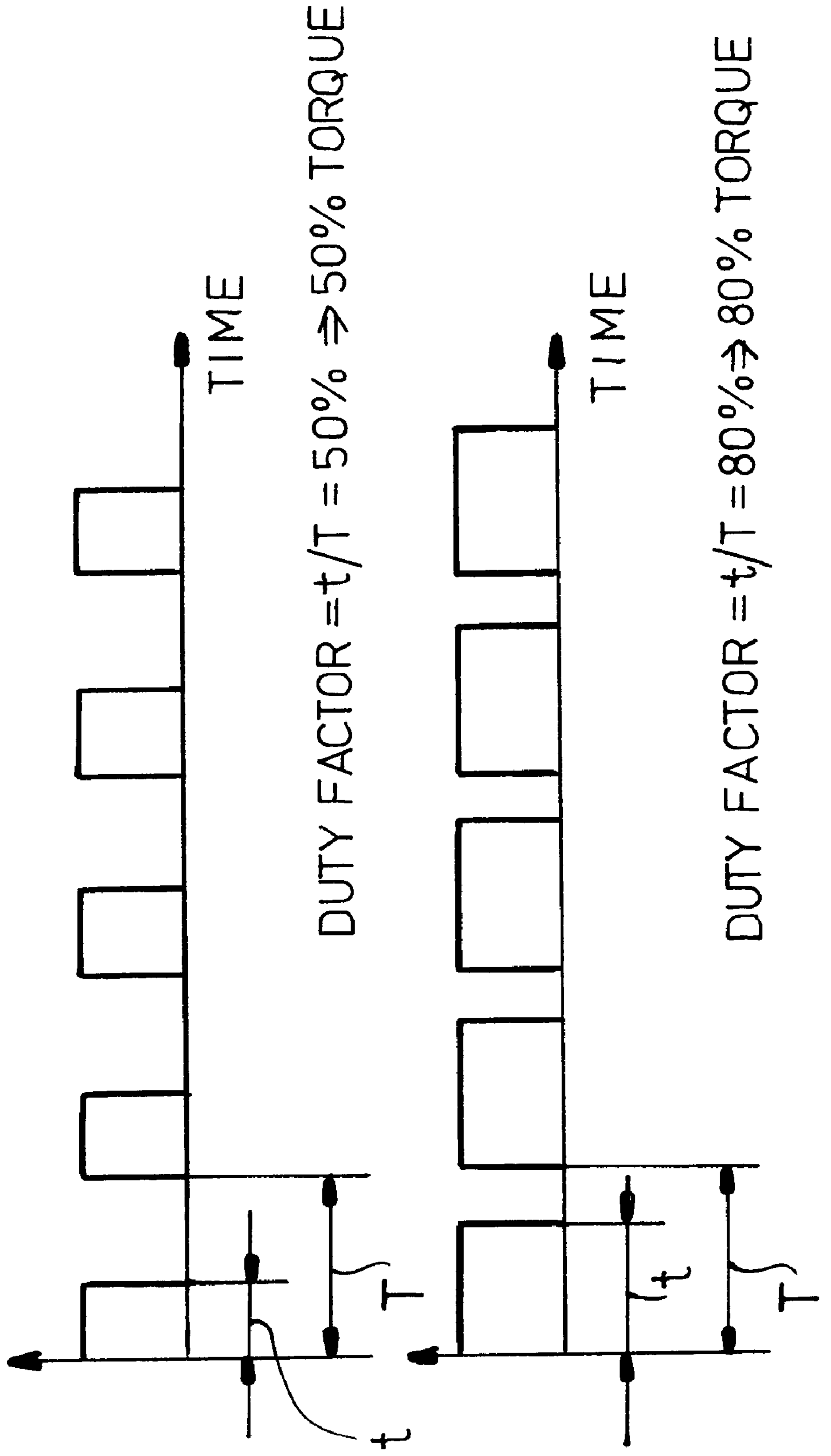
FIG. 4 is a timing diagram illustrating different duty factors in keying ratios in pulse-width modulation.

In FIG. 4, for example, the pulse-width modulation is shown in two graphs in which, in the first, the duty factor t/T is 50% which corresponds to a 50% of the torque originally produced by the motor. The duty factor in the lower graph is 80% which corresponds to 80% of the maximum possible and, of course, the original torque. The graphs in both cases show a linear relationship between the electric power or current and the torque.

The variation in the duty factor along a single ramp segment or a plurality of ramp segments can be effected by a pulse-width modulator having outputs from a microprocessor or microcontroller 6 to semiconductor elements 7 in the form of field-effect transistors and diode bridges as represented at 7 connected across the motor 1 and between the positive battery terminal plus U and ground. The microprocessor can be provided with an internal program defining the ramps by energizing the field-effect transistors with the appropriate time course upon receiving a signal initiating the unlocking or locking of the door.

We claim:

1. A motor-vehicle door lock comprising:

a lock housing;

a lock mechanism in said housing having a central locking lever displaceable between locked and unlocked positions and an actuator mechanically coupled with said lever for displacing same;

an electric motor drive coupled with said actuator and including an electric motor; and an electric circuit connected with said electric motor for electrically energizing same for a required time interval for displacing said lever between said positions whereby said electric motor drive is blocked at a blocking point in time within or at an end of said time interval, said electric circuit having circuit elements for reducing electrical energization of said motor so that at least one of the torque and speed of said motor is reduced with time along a ramp characteristic.

2. The motor-vehicle door lock defined in claim 1 wherein said electric circuit includes a pulse-width modulator for energizing said motor at a beginning of said ramp with a predetermined maximum value of a pulse-width modulation duty factor and reducing said pulse-width modulation duty factor along said ramp characteristic to a minimum value.

3. The motor-vehicle door lock defined in claim 2 wherein said pulse-width modulator is constructed and arranged so that said maximum value is about 100%.

4. The motor-vehicle door lock defined in claim 2 wherein said pulse-width modulator is constructed and arranged so that said minimum value is about 0%.

5. The motor-vehicle door lock defined in claim 2 wherein said pulse-width modulator is constructed and arranged so that the reduction of said pulse-width modulation duty factor along said ramp characteristic is substantially continuous.

6. The motor-vehicle door lock defined in claim 2 wherein said pulse-width modulator is constructed and arranged so that the reduction of said pulse-width modulation duty factor along said ramp characteristic is carried out along a plurality of linear segments of different slopes.

7. The motor-vehicle door lock defined in claim 2 wherein said pulse-width modulator is constructed and arranged so that the reduction of said pulse-width modulation duty factor along said ramp characteristic coincides with said point in time.

8. The motor-vehicle door lock defined in claim 2 wherein said pulse-width modulator is constructed and arranged so that the reduction of said pulse-width modulation duty factor along said ramp characteristic commences at a predetermined interval prior to said point in time.

9. The motor-vehicle door lock defined in claim 2 wherein the motor-vehicle lock forms part of a central locking system for a motor vehicle.

10. The motor-vehicle door lock defined in claim 2 wherein said drive includes a transmission between said electric motor and said actuator.

* * * * *